United States Patent
Jeon et al.

(10) Patent No.: US 8,665,821 B2
(45) Date of Patent: Mar. 4, 2014

(54) METHOD AND APPARATUS FOR SWITCHING FREQUENCY ASSIGNMENT IN WIRELESS COMMUNICATION SYSTEM

(75) Inventors: Joseph Jeon, Yongin-si (KR); Pisut Sanyadechakul, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 804 days.

(21) Appl. No.: 12/832,271

(22) Filed: Jul. 8, 2010

(65) Prior Publication Data

US 2011/0013588 A1     Jan. 20, 2011

(30) Foreign Application Priority Data

Jul. 17, 2009   (KR) .................. 10-2009-0065321

(51) Int. Cl.
*H04W 4/00*     (2009.01)

(52) U.S. Cl.
USPC .......................................... 370/331; 370/332

(58) Field of Classification Search
None
See application file for complete search history.

(56) References Cited

U.S. PATENT DOCUMENTS

| | | | | |
|---|---|---|---|---|
| 8,270,353 | B2 * | 9/2012 | Kim et al. ..................... | 370/329 |
| 2005/0003796 | A1 * | 1/2005 | Kashiwase .................... | 455/403 |
| 2005/0148368 | A1 * | 7/2005 | Scheinert et al. ............ | 455/561 |
| 2006/0089144 | A1 * | 4/2006 | Kim et al. ..................... | 455/439 |
| 2007/0135134 | A1 * | 6/2007 | Patrick ......................... | 455/456.1 |
| 2007/0217387 | A1 * | 9/2007 | Choi et al. .................... | 370/342 |
| 2008/0233961 | A1 * | 9/2008 | Cho et al. ..................... | 455/436 |
| 2008/0242340 | A1 * | 10/2008 | Kang et al. .................... | 455/525 |
| 2008/0291875 | A1 * | 11/2008 | Kang et al. .................... | 370/331 |
| 2008/0318574 | A1 * | 12/2008 | Bi ................................ | 455/436 |
| 2009/0047961 | A1 * | 2/2009 | Kim ............................. | 455/436 |
| 2009/0052382 | A1 * | 2/2009 | Stephenson et al. .......... | 370/329 |
| 2009/0221287 | A1 * | 9/2009 | Balasubramanian et al. | 455/434 |
| 2009/0264142 | A1 * | 10/2009 | Sankar et al. ................. | 455/501 |
| 2009/0298515 | A1 * | 12/2009 | Czaja et al. .................. | 455/456.5 |
| 2010/0008246 | A1 * | 1/2010 | Watanabe ..................... | 370/252 |
| 2010/0113032 | A1 * | 5/2010 | Lee et al. ...................... | 455/437 |
| 2010/0165921 | A1 * | 7/2010 | Maheshwari et al. ........ | 370/328 |
| 2010/0202406 | A1 * | 8/2010 | Feder et al. ................... | 370/331 |
| 2010/0291934 | A1 * | 11/2010 | Lopes ........................... | 455/446 |
| 2012/0320882 | A1 * | 12/2012 | Sankar et al. ................. | 370/336 |

* cited by examiner

*Primary Examiner* — Phirin Sam
(74) *Attorney, Agent, or Firm* — Jefferson IP Law, LLP (57) ABSTRACT

A method and an apparatus for FA switching in a wireless communication system are provided. The apparatus includes a base station for broadcasting a neighbor list, which includes a base station identifier, an FA identifier, and a preamble index corresponding to a first FA, and neighbor base station information, to mobile stations that the base station provides a service for, one of, unicasting a scanning indication message for the first FA to each of the mobile stations and broadcasting the scanning indication message to the mobile stations, for temporarily switching a second FA, which is being currently used, to the first FA, for transmitting a preamble signal corresponding to the first FA to the mobile stations by using the FA identifier and the preamble index during a preset scanning time interval, and for switching the second FA to the first FA according to a scanning result received from the mobile stations in response to the scanning indication message.

18 Claims, 8 Drawing Sheets

METHOD AND APPARATUS FOR SWITCHING FREQUENCY ASSIGNMENT IN WIRELESS COMMUNICATION SYSTEM

PRIORITY

This application claims the benefit under 35 U.S.C. §119(a) of a Korean patent application filed in the Korean Intellectual Property Office on Jul. 17, 2009 and assigned Serial No. 10-2009-0065321, the entire disclosure of which is hereby incorporated by reference.

BACKGROUND OF THE INVENTION

1. Field of the Invention

The present invention relates to a wireless communication system. More particularly, the present invention relates to a method and an apparatus for switching frequency assignment in a wireless communication system.

2. Description of the Related Art

A Dynamic Frequency Selection (DFS) algorithm is one of channel allocation schemes for dynamically setting a frequency for preventing the occurrence of interference between apparatuses (e.g., a base station), each of which uses one frequency for communication.

The DFS algorithm is used in applications of a network based on the Institute of Electrical and Electronics Engineers (IEEE) 802.16e standard and enables a base station to continuously provide a service regardless of a rapid network environment change. When the network environment changes, the base station can change its own Frequency Assignment (FA) by using the DFS algorithm.

For example, in a network including multiple mobile base stations, when a network environment change occurs due to an addition, a deletion or movement of a base station, each base station may receive an interference signal from at least one different base station due to the network environment change. At this time, each base station may use the DFS algorithm in order to prevent service quality degradation due to the receiving of the interference signal. Then, each base station can change the FA, which the base station is currently using, to a new FA, which is optimal for the current network environment of the base station itself, to continuously provide a service to mobile stations.

In the meantime, mobile stations in the network may either support or may not support use of the DFS algorithm by the base station. However, in a wireless communication system according to the related art, a base station is unable to determine if the mobile stations support use of the DFS algorithm perform the FA switching. That is, problems may arise in providing a service using the FA switching due to a compatibility problem in supporting the DFS algorithm between the base station and the existing mobile stations.

Therefore, a need exists for a method and an apparatus for FA switching by a base station using a DFS algorithm in a wireless communication system.

SUMMARY OF THE INVENTION

An aspect of the present invention is to address the above-mentioned problems and/or disadvantages and to provide at least the advantages described below. Accordingly, an aspect of the present invention is to provide a method and an apparatus for Frequency Assignment (FA) switching in a wireless communication system.

Another aspect of the present invention is to provide a method and an apparatus for FA switching, which enables a mobile station to switch to a new FA at a particular time point by a base station in a wireless communication system.

Yet another aspect of the present invention is to provide a method and an apparatus for FA switching, which enables a base station to continuously provide a service without degradation in the service quality in a wireless communication system.

In accordance with an aspect of the present invention, a method for FA switching of a base station in a wireless communication system is provided. The method includes broadcasting a neighbor list, which includes a base station identifier, an FA identifier, and a preamble index corresponding to a first FA, and neighbor base station information, to mobile stations that the base station provides a service, one of unicasting a scanning indication message for the first FA to each of the mobile stations and broadcasting the scanning indication message to the mobile stations, temporarily switching a second FA, which is being currently used, to the first FA, transmitting a preamble signal corresponding to the first FA to the mobile stations by using the FA identifier and the preamble index during a preset scanning time interval, and switching the second FA to the first FA according to a scanning result received from the mobile stations in response to the scanning indication message.

In accordance with another aspect of the present invention, a method for FA switching of a mobile station in a wireless communication system is provided. The method includes receiving a neighbor list including neighbor base station information broadcasted from a base station, and a scanning indication message for a first FA, to which the FA switching is to be performed, the scanning indication message being one of unicasted and broadcasted from the base station, temporarily switching a second FA, which is being currently used, to the first FA, and receiving a preamble signal corresponding to the first FA during a preset scanning time interval, scanning the preamble signal using scanning information for the first FA included in the scanning indication message, transmitting a scanning result to the base station, and switching the second FA to the first FA according to a control of the base station, wherein the neighbor list includes a base station identifier, an FA identifier, and a preamble index, which correspond to the first FA.

In accordance with yet another aspect of the present invention, an FA switching apparatus of a base station in a wireless communication system is provided. The apparatus includes a transmitting unit for transmitting a wireless signal, a receiving unit for receiving a wireless signal, an FA selection unit for selecting a first FA to FA switching, a neighbor list management unit for managing a neighbor list, which includes neighbor base station information, a base station identifier, an FA identifier, and a preamble index corresponding to the first FA, and a control unit for broadcasting the neighbor list to mobile stations, to which the base station provides a service, for, one of, unicasting a scanning indication message for the first FA to each of the mobile stations and broadcasting the scanning indication message to the mobile stations through the transmitting unit, for temporarily switching a second FA, which is being currently used, to the first FA, for transmitting a preamble signal corresponding to the first FA to the mobile stations by using the FA identifier and the preamble index during a preset scanning time interval through the transmitting unit, for switching the second FA to the first FA according to a scanning result received from the mobile stations in response to the scanning indication message.

In accordance with still another aspect of the present invention, an FA switching system in a wireless communication system is provided. The system includes a base station, and a mobile station for receiving a neighbor list including neighbor base station information broadcasted from the base station, and a scanning indication message for a first FA, to which the FA switching is to be performed, the scanning indication message being one of unicasted and broadcasted from the base station, for temporarily switching, after receiving the scanning indication message, a second FA, which is being currently used, to the first FA, receiving a preamble signal corresponding to the first FA during a preset scanning time interval, for scanning the preamble signal using scanning information for the first FA included in the scanning indication message, for transmitting a scanning result to the base station, and for switching the second FA to the first FA according to a control of the base station, wherein the neighbor list includes a base station identifier, an FA identifier, and a preamble index, which correspond to the first FA.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF THE EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness. The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and an apparatus for Frequency Assignment (FA) switching in a wireless communication system, for example, an Institute of Electrical and Electronics Engineers (IEEE) 802.16e communication system. More specifically, exemplary embodiments of the present invention provide a method and an apparatus for enabling a base station to perform more efficient switching between FAs used for a communication between a base station and a corresponding mobile station by using a handover processing method defined in the IEEE 802.16e standard.

Although the following description is based on the IEEE 802.16e communication system as an example for convenience of description, exemplary embodiments of the present invention may be applied to other communication systems. Also, it should be noted that "FA switching" and "FA change" are mixedly used as described below with the same meaning without discrimination between them.

Hereinafter, elements of a base station supporting switching between FAs according to an exemplary embodiment of the present invention will be described with reference to FIG. 1.

Figure 1:
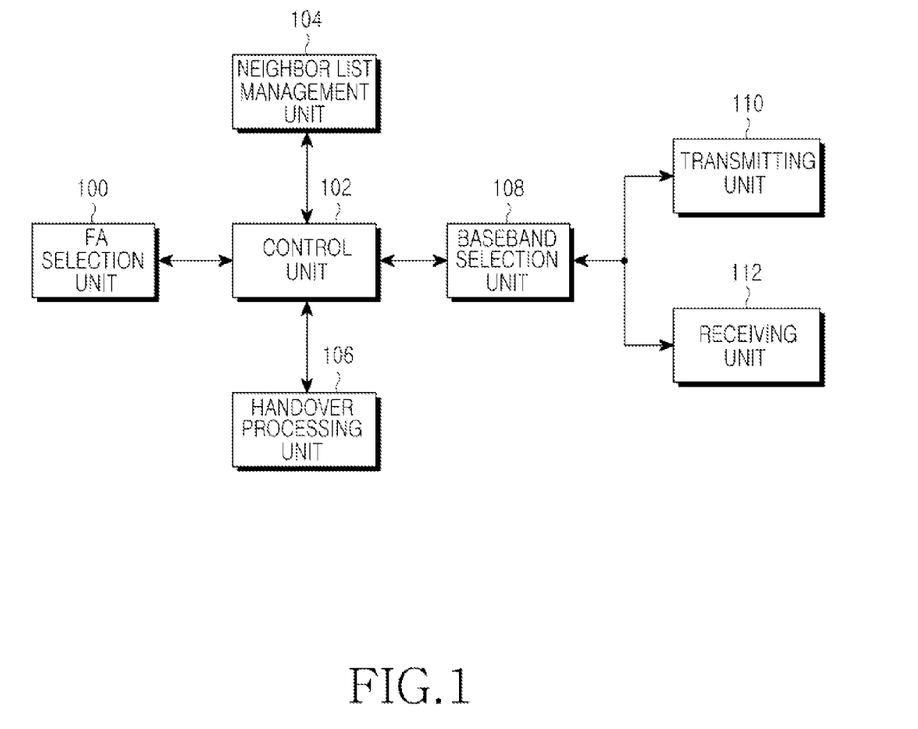
FIG. 1 is a block diagram illustrating elements of a base station supporting switching between Frequency Assignments (FAs) according to an exemplary embodiment of the present invention.

FIG. 1 is a block diagram illustrating elements of a base station supporting switching between FAs according to an exemplary embodiment of the present invention.

Referring to FIG. 1, the base station includes an FA selection unit 100, a control unit 102, a neighbor list management unit 104, a handover processing unit 106, a baseband selection unit 108, a transmitting unit 110, and a receiving unit 112.

The FA selection unit 100 determines whether to change the FA, which is currently used by the base station, according to a change in a network environment. If it is determined that the FA currently being used by the base station should be changed, the FA selection unit 100 transmits an FA change request signal to the control unit 102. The FA change request signal includes information regarding the FA information selected by the FA selection unit 100, that is, the FA information to be changed. The FA selection unit 100 receives an FA change response signal from the control unit 102 in response to the FA change request signal.

The control unit 102 controls general operations of the FA selection unit 100, the neighbor list management unit 104, the handover processing unit 106, the baseband selection unit 108, the transmitting unit 110, and the receiving unit 112. An operation of the control unit 102 will be described in more detail below.

The neighbor list management unit 104 stores and manages the neighbor list including information of neighbor base stations adjacent to the base station. More specifically, under the control of the control unit 102, the neighbor list management unit 104 revises or deletes the neighbor base station information included in the neighbor list, or adds new neighbor base station information to the neighbor list.

Under the control of the control unit 102, the handover processing unit 106 performs an FA handover process. Further, the handover processing unit 106 transmits a result of the FA handover process to the control unit 102.

The baseband selection unit 108 performs FA switching under the control of the control unit 102. That is, the baseband selection unit 108 either changes or maintains the currently used FA under the control of the control unit 102.

Under the control of the control unit 102, the transmitting unit 110 transmits the neighbor list, a preamble signal for FA scanning of mobile stations, a handover message, a message for performing a network entry, and the like, to the mobile stations.

Further, the receiving unit 112 receives a handover message, a message for performing a network entry, and the like, from the mobile stations.

Hereinafter, operations of the elements of the base station illustrated in FIG. 1 will be described in more detail with reference to FIG. 2.

Figure 2:
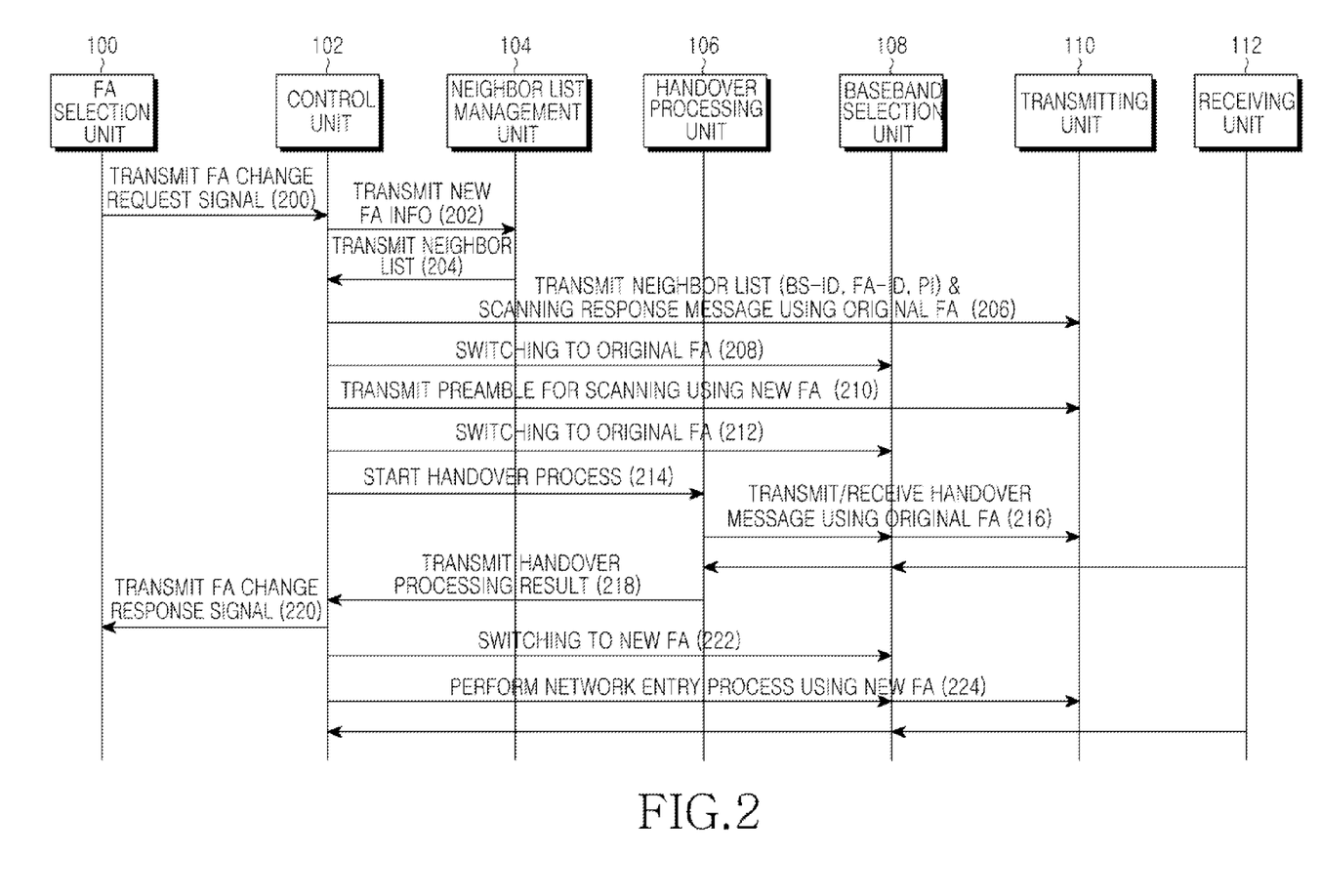
FIG. 2 is a signal flow diagram illustrating signal flow between elements of a base station according to an exemplary embodiment of the present invention.

FIG. 2 is a signal flow diagram illustrating signal flow between elements of a base station according to an exemplary embodiment of the present invention.

Referring to FIG. 2, when FA switching is needed, the FA selection unit 100 transmits an FA change request signal to the control unit 102 in step 200. The FA change request signal includes information of the FA (i.e., new FA), to which the FA selection unit 100 wants to switch the existing FA.

The control unit 102 receives the FA change request signal and identifies the information of the new FA. Further, the control unit 102 acquires a Base Station Identifier (BS-ID) corresponding to the new FA from a Wireless System Manager (WSM) that manages base stations, because the new FA is identified as a virtual neighbor base station by the BS-ID.

In the meantime, a case in which the BS-ID corresponding to the new FA is identical to the BS-ID of the base station may occur in a mobile base station environment. Therefore, according to an exemplary embodiment of the present invention, a Preamble Index (PI) and an FA-ID are used together with the BS-ID in order to achieve a more exact identification of the new FA. The PI and the FA-ID may be proper for the current network environment from among PIs and FA-IDs stored in a PI selection pool and an FA selection pool preset in the base station.

Instead of acquiring the BS-ID from the WSM, the control unit 102 may generate a BS-ID by itself in consideration of a WSM-ID, an Access Control Router Identifier (ACR-ID), the PI, and the FA-ID. The control unit 102 may transmit information regarding the generated BS-ID to the WSM managing the base stations, in order to prevent repeated creations of the same BS-ID because the WSM manages the base stations by using the BS-IDs. Therefore, the WSM also may manage the new FA as a virtual base station through the generated BS-ID.

The control unit 102 transmits the new FA information, including the BS-ID, PI, and FA-ID, to the neighbor list management unit 104 in step 202.

After receiving the new FA information, the neighbor list management unit 104 adds the new FA information, including the BS-ID, PI, and FA-ID, to the neighbor list, under the control of the control unit 102. The new FA information is used as information of one neighbor base station after being added to the neighbor list.

After the new FA information is added to the neighbor list as described above, the neighbor list management unit 104 transmits the neighbor list including the added new FA information to the control unit 102 in step 204.

Thereafter, the control unit 102 transmits the neighbor list and a scanning response message to the transmitting unit 110 by using the currently used FA (i.e., original FA) in step 206. The scanning response message includes information indicating that a scanning target base station has been set to the new FA, which is a virtual neighbor base station. That is, the scanning response message includes an FA identifier indicating a neighbor base station to be scanned for from among the neighbor base stations included in the neighbor list.

According to an exemplary embodiment of the present invention, the scanning response message may be either unsolicitedly transmitted based on a determination of the control unit 102 regardless of a scanning request from a mobile station as illustrated in FIG. 2 or solicitedly transmitted in response to a scanning request from a mobile station.

Under the control of the control unit 102, the baseband selection unit 108 selects the original FA as the FA to be currently used, and the transmitting unit 110 transmits the neighbor list and the scanning response message to the mobile stations managed by the base station by using the original FA selected by the baseband selection unit 108.

According to an exemplary embodiment of the present invention, the scanning response message may be, for example, a Mobile Scanning Interval Allocation Response (MOB_SCN-RSP) message used during a handover process. Further, the scanning response message includes scanning start point information indicating a start point of the scanning operation and scanning time interval information indicating the length of a time interval for the scanning.

The mobile stations having received the neighbor list and the scanning response message, together with the base station, may scan for a corresponding neighbor base station during the same time interval at the same time point. According to an exemplary embodiment of the present invention, since the new FA is included as a virtual neighbor base station in the neighbor list, the scanning for the new FA may be performed as described above.

In step 208, the control unit 102 switches to the new FA by controlling the baseband selection unit 108, so that the mobile stations may perform the scanning for the new FA. Further, the control unit 102 identifies a preamble signal corresponding to the new FA by using the FA-ID and the PI. The control unit 102 then transmits the preamble signal for scanning of the mobile stations through the transmitting unit 110 by using the new FA during a scanning time interval based on the scanning start point information and the scanning time interval information. That is, the preamble signal corresponding to the new FA is temporarily transmitted during the scanning time interval to enable the mobile stations to detect the new FA.

When the scanning of the mobile stations is completed, the control unit 102 switches the new FA back to the original FA by controlling the baseband selection unit 108 in step 212. The control unit 102 receives the scanning result for the new FA from the mobile stations by using the original FA.

Based on the scanning result received from the mobile stations, the control unit 102 determines whether to perform a handover to the new FA. If it is determined that it will not perform the handover to the new FA, the control unit 102 continues to use the original FA. In contrast, if it is determined that it will perform the handover to the new FA, the control unit 102 starts the handover process to the new FA by controlling the handover processing unit 106.

In step 216, the handover processing unit 106 transmits and receives handover messages to and from the mobile stations through the transmitting unit 110 and the receiving unit 112 by using the original FA. Also, when the handover process is completed, the handover processing unit 106 transmits a handover processing result to the control unit 102 in step 218.

In step 220, the control unit 102 transmits an FA change response signal based on the handover processing result to the FA selection unit 100. More specifically, when the handover to the new FA is successfully completed, the control unit 102 transmits an FA change response signal, including information indicating that a change of the FA is possible, to the FA selection unit 100.

Further, when the handover to the new FA fails, the control unit 102 transmits an FA change response signal, including information indicating that a change of the FA is impossible, to the FA selection unit 100. Therefore, when the handover to the new FA fails, the FA selection unit 100 may perform step 200 again by selecting another FA according to the network environment.

Meanwhile, when the handover to the new FA is successfully completed, the control unit 102 switches to the new FA by controlling the baseband selection unit 108 in step 222. Further, the control unit 102 performs a network entry process by using the new FA in step 224. In contrast, when the handover to the new FA fails, the control unit 102 controls the baseband selection unit 108 so that the original FA may be continuously used.

A handover process for FA switching according to an exemplary embodiment of the present invention will be described with reference to FIG. 3.

Figure 3:
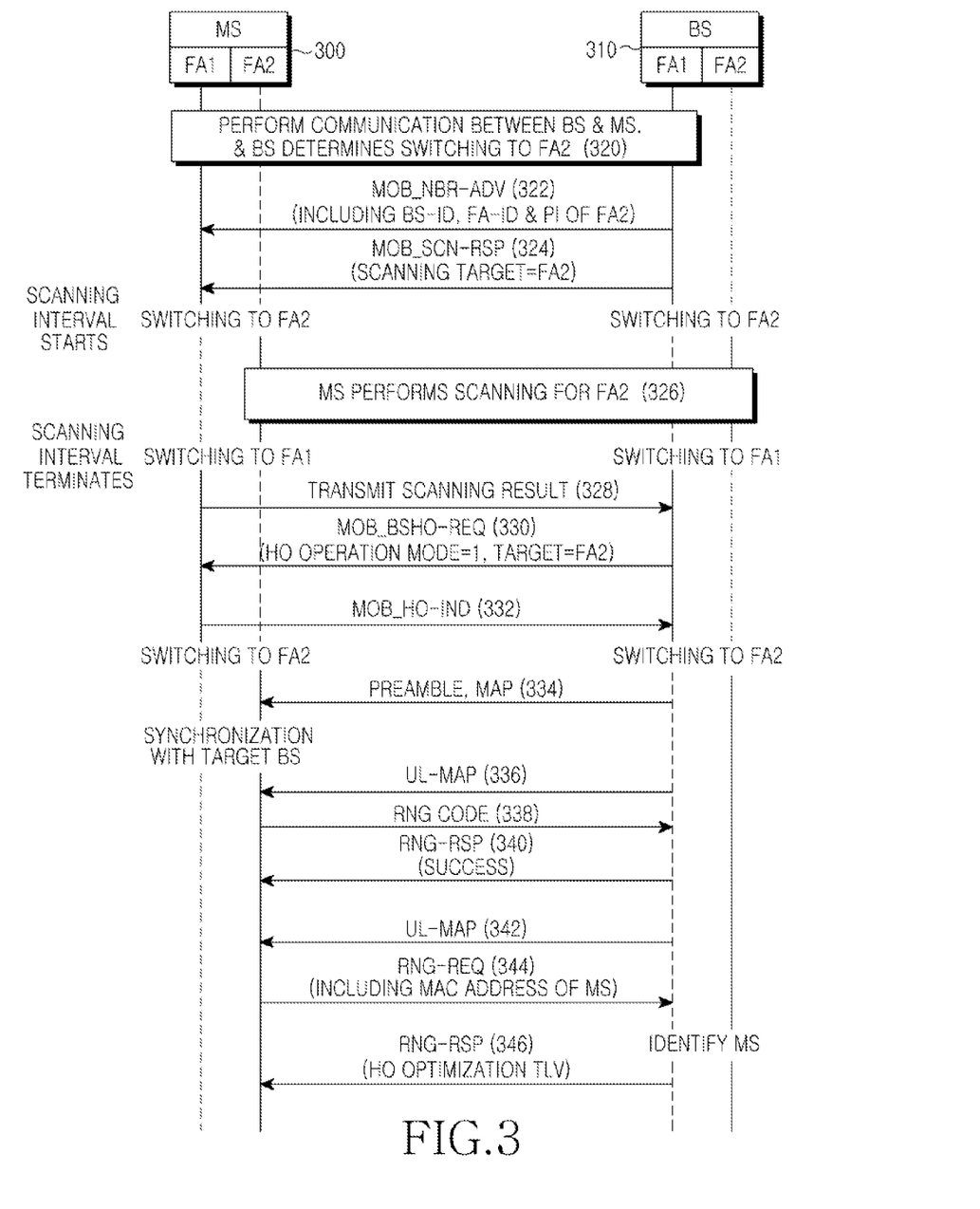
FIG. 3 is a signal flow diagram illustrating a handover process for FA switching according to an exemplary embodiment of the present invention.

FIG. 3 is a signal flow diagram illustrating a handover process for FA switching according to an exemplary embodiment of the present invention.

Referring to FIG. 3, a base station 310 and a mobile station 300 communicate with each other by using FA1 in step 320. The base station 310 has then determined to switch to FA2. Therefore, in FIG. 3, FA1 corresponds to the original FA and FA2 corresponds to the new FA.

In step 322, the base station 310 transmits a Mobile Neighbor Advertisement (MOB_NBR-ADV) message to the mobile station 300. The MOB_NBR-ADV message includes information of FA2 that is a BS-ID corresponding to FA2, P1 for identifying a preamble signal used in FA2, and an FA-ID for identifying FA2. According to an exemplary embodiment of the present invention, the MOB_NBR-ADV message may be transmitted either periodically or during an event.

Thereafter, in step 324, the base station 310 transmits a MOB_SCN-RSP message to the mobile station 300. The MOB_SCN-RSP message is used as a message for transmitting a scanning request to the mobile station 300. The MOB_SCN-RSP message may be transmitted either according to a unicast scheme or according to a broadcast scheme in order to reduce the overhead.

The MOB_SCN-RSP message includes information indicating that FA2 has been set as the scanning target base station. That is, the neighbor list includes an FA identifier indicating FA2.

Further, the MOB_SCN-RSP message includes scanning time interval information and scanning start point information, to enable the mobile station 300 to perform an exact scanning for FA2.

Although the base station 310 transmits a request for the scanning to the mobile station 300 in FIG. 3, the mobile station 300 may request for the scanning by transmitting a Mobile Scanning Interval Allocation Request (MOB_SCN-REQ) message to the base station 310.

Further, upon receiving the MOB_SCN-REQ message, the base station 310 may transmit the MOB_SCN-RSP message to the mobile station 300. Consequently, even without receiving the MOB_SCN-REQ message, the base station 310 may unsolicitedly transmit the MOB_SCN-RSP message to the mobile station 300.

After the MOB_SCN-RSP message is transmitted to the mobile station 300, the base station 310 and the mobile station 300 switch from FA1 to FA2 for the scanning for FA2. The base station 310 then identifies a preamble signal of FA2 by using the P1 and FA-ID, and transmits the identified preamble signal by using FA2.

Further, by using the FA identifier included in the MOB_NBR-ADV message, the mobile station 300 identifies FA2, that is, the neighbor base station for which the neighbor list is scanned. Thereafter, in step 326, the mobile station 300 scans the quality of the preamble signal transmitted through FA2 by using scanning start point information and scanning time interval information included in the MOB_SCN-RSP message. The quality of the preamble signal may be measured by, for example, a Carrier to Interference-and-Noise Ratio (CINR), a signal quality, and a signal intensity.

When the scanning is completed, the base station 310 and the mobile station 300 switch from FA2 to FA1. In step 328, the mobile station 300 transmits a result of the scanning result for FA2 to the base station 310.

When the base station 310 determines that switching to FA1 is required based on a result of the scanning, that is, if it is determined that the currently used FA1 is to be changed to FA2, the base station 310 transmits a Base Station HandOver Request (MOB_BSHO-REQ) message to the mobile station 300 in step 330. In the MOB_BSHO-REQ message, a value of a handover operation mode indicating handover determination/denial is set to 1 that indicates determination of the handover, and a target base station value indicating the target base station is set to FA2.

The mobile station 300 then identifies that FA2, which is a virtual neighbor base station, has been selected as the final target base station, to which it will handover, and transmits a Mobile Handover Indication (MOB_HO-IND) message, which is a response to the MOB_BSHO-RSP message, to the base station 310 in step 332.

The MOB_HO-IND message includes information indicating if the mobile station 300 has approved the handover or denied the handover. When the MOB_HO-IND message includes information that the mobile station 300 has denied the handover, the base station 310 does not handover to FA2 and continues to use the currently used FA1. In contrast, when the MOB_HO-IND message includes information that that the mobile station 300 has determined the handover, the base station 310 performs the handover to FA2.

The process illustrated in FIG. 3 corresponds to a case in which the MOB_HO-IND message includes information that that the mobile station 300 has approved the handover. In this case, the mobile station 300 and the base station 310 switch from FA1 to FA2 after the handover process is completed.

Further, in order to perform communication with the mobile station 300 by using FA2, the base station 310 transmits a preamble signal and a MAP to the mobile station 300 in step 334. Upon receiving the preamble signal and the MAP, the mobile station 300 performs synchronization with the target base station using FA2.

Thereafter, the base station 310 transmits an uplink map message to the mobile station 300 in step 336. Then, the mobile station 300 transmits a ranging code to the base station 310 in step 338. The base station 310 transmits a Ranging Response (RNG-RSP) message, which indicates that the ranging has been successfully performed, to the mobile station 300 in step 340.

Further, the base station 310 transmits an uplink map message to the mobile station 300 in step 342. The mobile station 300 transmits a Ranging Request (RNG-REQ) message, which includes a MAC address of the mobile station 300, to the base station 310 in step 344.

The base station 310 then identifies the mobile station 300 through the MAC address included in the RNG-REQ message, and transmits an RNG-RSP message, which includes a HandOver (HO) optimization value in the form of Type, Length, and Value (i.e., HO optimization TLV), to the mobile station 300 in step 346. This process is performed in order to report to the mobile station 300 by the base station 310 that the network entry process may be omitted.

According to an exemplary embodiment of the present invention as described above, an FA, to which switching is required, is set as a virtual neighbor base station, so that FA switching is performed according to a handover of a mobile station to the virtual neighbor base station. Therefore, in an exemplary implementation, a base station and a mobile station may perform FA switching in a more easy and simple manner.

Hereinafter, a handover process of a base station for FA switching according to an exemplary embodiment of the present invention will be described with reference to FIG. 4.

Figure 4:
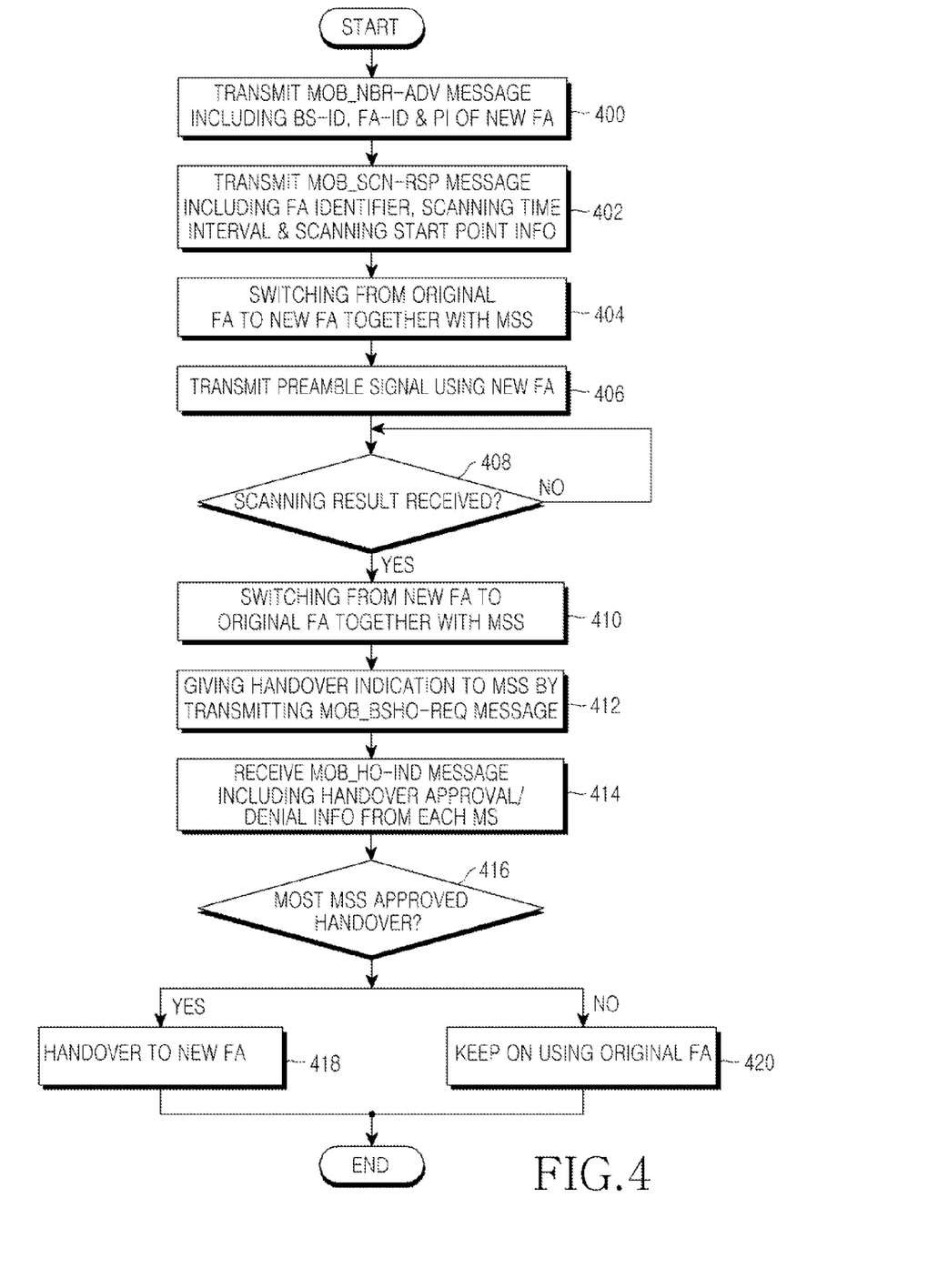
FIG. 4 is a flowchart illustrating a handover process of a base station for FA switching according to an exemplary embodiment of the present invention.

FIG. 4 is a flowchart illustrating a handover process of a base station for FA switching according to an exemplary embodiment of the present invention.

Referring to FIG. 4, in step 400, when a base station has selected a new FA in order to change the FA, the base station transmits a MOB_NBR-ADV message, which includes a BS-ID of the new FA, FA-ID, and PI information, to mobile stations to which the base station provides a service. According to the transmission of the MOB_NBR-ADV message, the new FA is broadcasted to all the mobile stations which the base station manages. The MOB_NBR-ADV message may be either unicasted to each mobile station or broadcasted to all the mobile stations.

In step 402, the base station transmits a MOB_SCN-RSP message including scanning target base station information, which includes FA identifier information, scanning time interval information, and scanning start point information, to the mobile stations. That is, the base station requests the mobile stations to perform a scanning for the new FA by transmitting a MOB_SCN-RSP message.

In step 404, the base station switches an original FA to a new FA, together with the mobile stations. In step 406, the base station identifies the preamble signal of the new FA by using the PI and FA-ID, and transmits the identified preamble signal to the mobile stations by using the new FA.

The mobile stations then scan the quality of the preamble signal transmitted through the new FA by using the information included in the MOB_SCN-RSP message. Also, when the scanning for the new FA has been completed, the mobile stations transmit a result of the scanning to the base station.

When the base station has received a result of the scanning from the mobile stations in step 408, the base station proceeds to step 410, in which the base station, together with the mobile stations, switches the new FA to the original FA.

When the base station determines, based on the scanning result, that the currently used original FA should be switched to a new FA, the base station transmits a MOB_BSHO-REQ message, in which a handover operation mode value has been set to 1 and a target base station value has been set to the new FA, to the mobile stations in step 412. The MOB_BSHO-REQ message is used in order to indicate the handover to the new FA to the mobile stations.

Although not illustrated in FIG. 4, when the base station determines, based on the scanning result, that it is unnecessary to switch the currently used original FA to a new FA, the base station continues to use the currently used original FA without performing the handover process to the new FA.

As a response to the MOB_BSHO-REQ message, the base station receives a MOB_HO-IND message, which includes information regarding if each mobile station will perform the handover, from each of the mobile stations in step 414.

The information regarding if each mobile station will perform the handover includes information regarding if each mobile station has determined to perform the handover or information regarding if each mobile station has denied the handover.

Therefore, in step 416, by verifying the information regarding if each mobile station will perform the handover, the base station determines if most of the mobile stations have approved the handover. According to an exemplary embodiment of the present invention, by determining if the number of mobile stations having determined to perform the handover exceeds a preset threshold, the base station determines if most of the mobile stations have approved the handover.

When most of the mobile stations have approved the handover, the base station proceeds to step 418, in which the base station performs the handover to the new FA. When most of the mobile stations have not approved the handover, the base station proceeds to step 420, in which the base station continues to use the currently used original FA without performing the handover to the new FA.

When the base station has determined the handover to the new FA, each of the mobile stations may perform the following three procedures.

First, each of the mobile stations can perform the handover to the new FA, like the base station. Second, each of the mobile stations can deny the handover to the new FA. Further, instead of performing the two procedures, each of the mobile stations can perform a handover to another base station regardless of the handover determination of the base station to the new FA.

Hereinafter, the three operation procedures of the mobile stations as described above will be described in more detail. Although the following description provides an operation procedure of only one mobile station, it should be understood that the present invention is not limited thereto. Accordingly, the operation procedure may be performed by multiple mobile stations according to an exemplary embodiment of the present invention.

An operation procedure of a mobile station having approved a handover to a new FA when a base station determined the handover to the new FA will be described with reference to FIG. 5.

Figure 5:
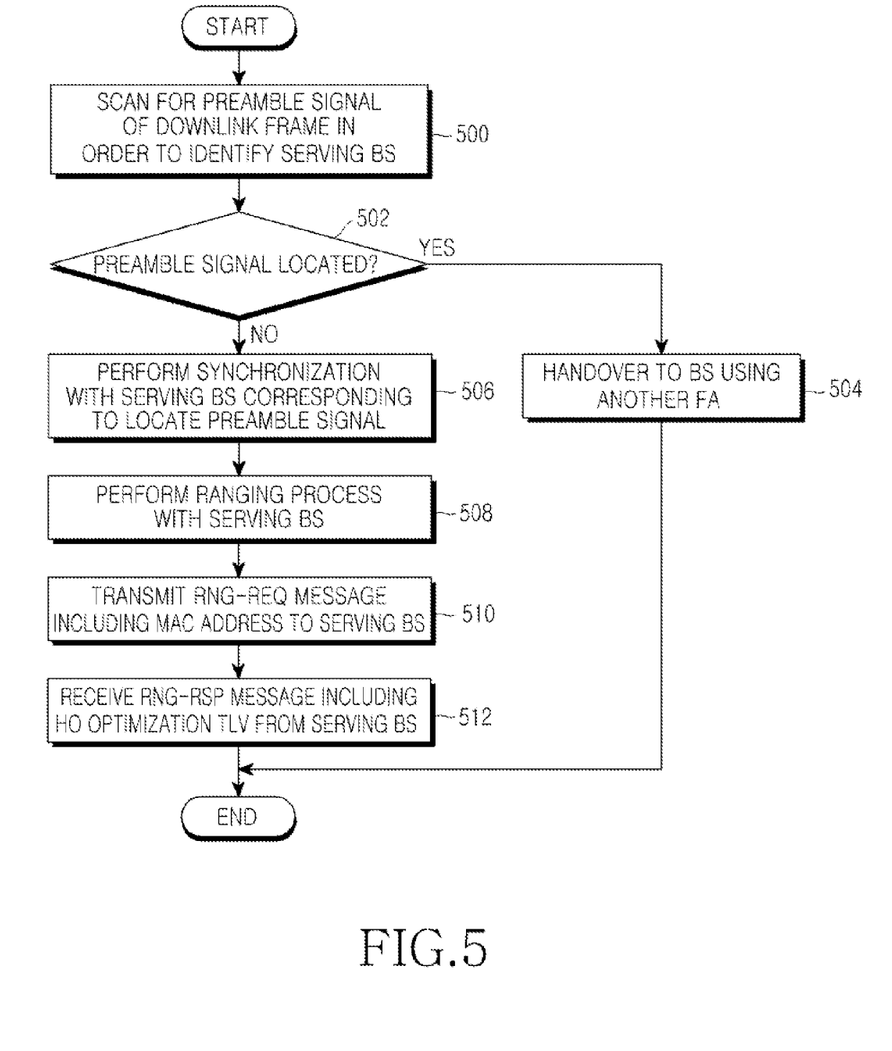
FIG. 5 is a flowchart illustrating an operation procedure of a mobile station, which has approved a handover to a new FA when a base station determined the handover to the new FA, according to an exemplary embodiment of the present invention.

FIG. 5 is a flowchart illustrating an operation procedure of a mobile station, which has approved a handover to a new FA when a base station determined the handover to the new FA, according to an exemplary embodiment of the present invention.

Referring to FIG. 5, according to a determination of handover to the new FA by the base station, the mobile station performs the handover to the new FA. Further, in step 500, in order to identify the serving base station, the mobile station scans for a preamble signal of a downlink frame received through the new FA.

In step 502, the mobile station determines if the preamble signal is located through the scanning. As a result of the determination in step 502, when the preamble signal is not located, the mobile station determines that the handover process of the base station to the new FA is performed later than the handover process of the mobile station to the new FA. Accordingly, when the preamble signal is not located during a preset time interval, the mobile station performs a handover to another base station using an FA different from the new FA in step 504.

In contrast, when the preamble signal is located through the scanning, the mobile station determines that the handover process of the base station to the new FA has been completed earlier than the handover process of the mobile station to the new FA. This is because the downlink frame including the preamble signal may be transmitted only after the handover to the new FA at the serving base station is completed. That is, the scanning process for the preamble signal as described above is a process for determining if the mobile station may perform communication with the base station without delay by using the new FA.

When the preamble signal is located as a result of the determination in step 502, the mobile station proceeds to step 506, in which the mobile station performs synchronization with the serving base station, i.e., a base station corresponding to the preamble signal. Further, the mobile station decodes the map message transmitted from the serving base station, and performs a ranging process with the serving base station in step 508.

Here, the mobile station may perform fast ranging or contention-based ranging. However, the contention-based ranging may cause a big delay due to contention between the mobile stations. Therefore, only execution of the fast ranging will be discussed below in more detail.

In order to perform the fast ranging, the mobile station is allocated a dedicated resource from the serving base station. Further, the mobile station performs the fast ranging by using fast ranging Information Elements (IEs) included in the uplink message. The mobile station receives the fast ranging IEs through the MOB_BSHO-REQ message from the serving base station. The MOB_BSHO-REQ message is a message transmitted to the mobile station before the handover to the new FA is performed.

Meanwhile, after the fast ranging process as described above is performed, the mobile station is allocated a resource from the serving base station, and transmits an RNG-REQ message including the MAC address of the mobile station to the serving base station in step 510. By using the MAC address, the serving base station may discriminate between a mobile station using the original FA and a mobile station using the new FA.

Context information of the mobile station in the original FA may be used by the serving base station using the new FA. Therefore, the serving base station transmits an RNG-RSP message including an HO optimization TLV indicating a mobile station, a network entry process of which is omissible, to the mobile station.

In step 512, the mobile station receives the RNG-RSP message including the HO optimization TLV in step 512, thereby omitting the network entry process with the serving base station.

Therefore, the mobile station may communicate with the serving base station through the new FA without performing a network entry process, after the ranging process.

An operation procedure of a mobile station, which has denied the handover to the new FA when the base station determined the handover to the new FA will be described with reference to FIG. 6.

Figure 6:
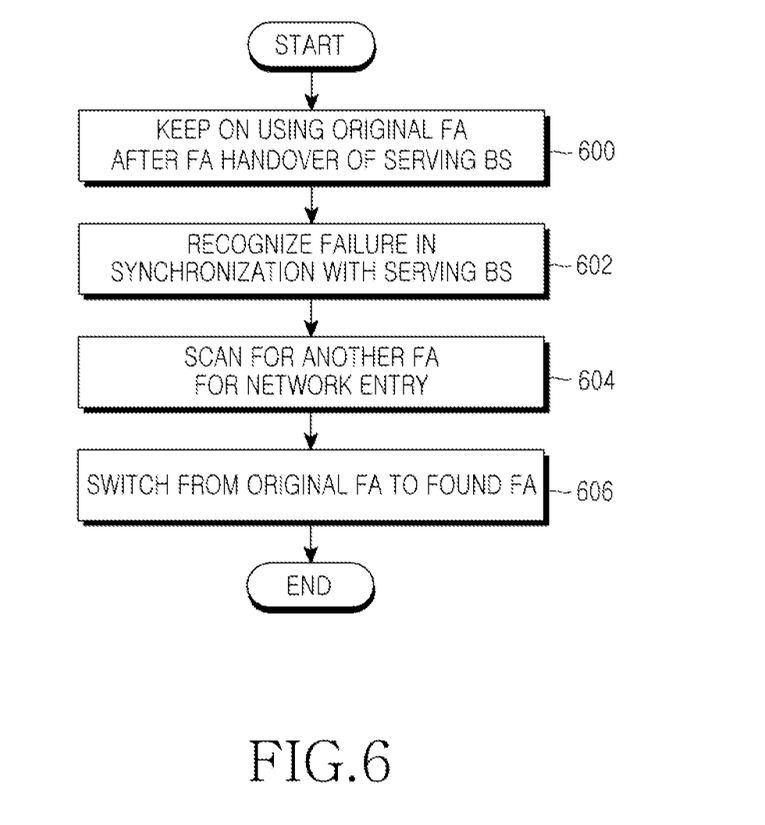
FIG. 6 is a flowchart illustrating an operation procedure of a mobile station which has denied handover to a new FA when a base station determined the handover to the new FA, according to an exemplary embodiment of the present invention.

FIG. 6 is a flowchart illustrating an operation procedure of a mobile station, which has denied handover to a new FA when a base station determined the handover to the new FA, according to an exemplary embodiment of the present invention.

It is assumed herein that the mobile stations receiving a service from the base station according to an exemplary embodiment of the present invention are located at different positions. Therefore, different channel qualities of the FA are recognized according to the positions of the mobile stations. That is, the new FA, to which the base station has performed handover, is unable to have good channel quality at all the mobile stations. Therefore, when the channel quality at the new FA is worse than the channel quality at the original FA, each of the mobile stations may deny the handover to the new FA.

FIG. 6 illustrates the operation process of a mobile station that has denied the handover to the new FA due to the above-mentioned reason.

Referring to FIG. 6, in step 600, the mobile station having denied the handover to the new FA continues to use the existing original FA even after the base station has performed the FA handover. Therefore, since the FA used by the mobile station is different from the FA used by the base station, the mobile station cannot detect a downlink frame transmitted from the base station. Accordingly, when a downlink frame is not detected during a preset time interval, the mobile station recognizes the failure in synchronization with the base station in step 602.

Further, in step 604, the mobile station scans for another FA for performing a network entry. Another FA may be a recommended FA included in the MOB_BSHO-REQ message or an FA used in a neighbor base station different from the currently used FA.

Thereafter, in step 606, the mobile station performs a network entry by using the scanned FA and then switches from the original FA to the scanned FA.

An operation procedure of a mobile station, which performs a handover to another base station regardless of a handover determination of a base station to a new FA will be described with reference to FIG. 7.

Figure 7:
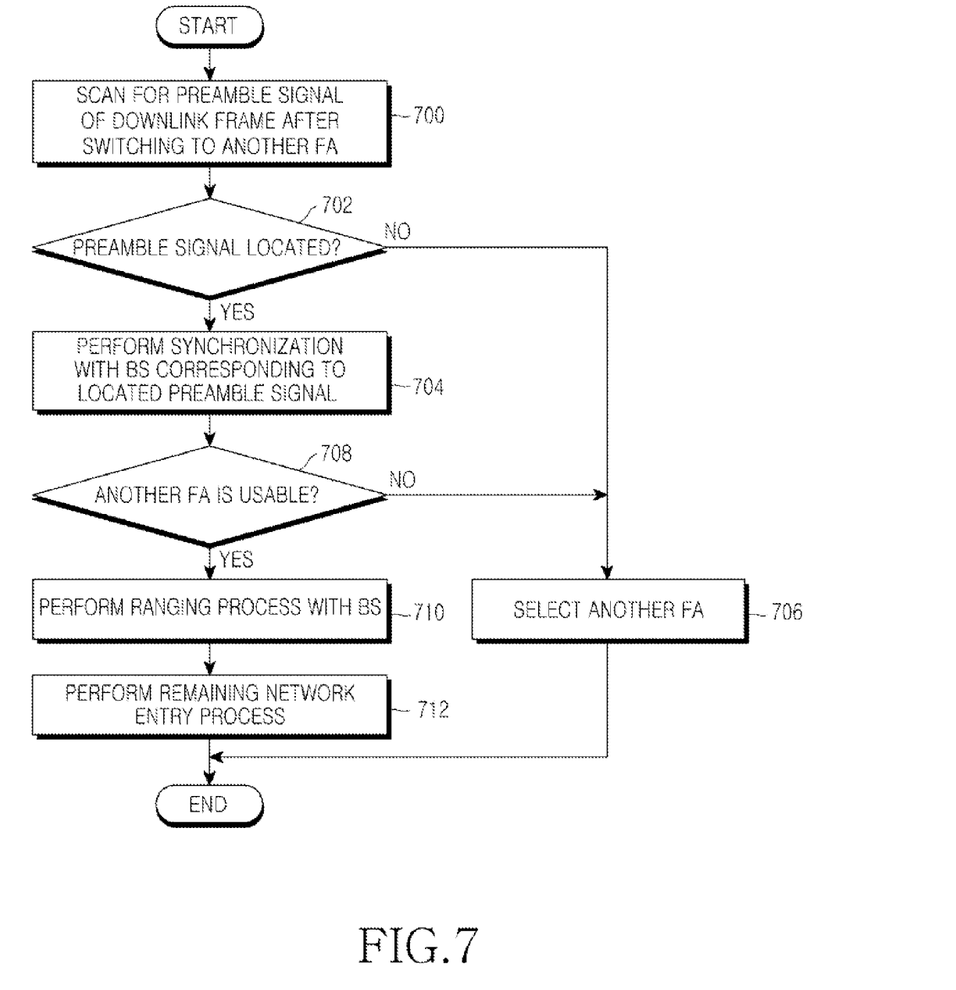
FIG. 7 is a flowchart illustrating an operation procedure of a mobile station, which performs a handover to another base station regardless of a handover determination of a base station to a new FA, according to an exemplary embodiment of the present invention.

FIG. 7 is a flowchart illustrating an operation procedure of a mobile station, which performs a handover to another base station regardless of a handover determination of a base station to a new FA, according to an exemplary embodiment of the present invention.

Referring to FIG. 7, the operation procedure may be performed when the mobile station has detected another FA having a better channel quality than the new FA during the scanning interval.

In step 700, the mobile station switches to the detected other FA and then scans for a preamble signal of a downlink frame. When the preamble signal is scanned in step 702, the mobile station proceeds to step 704, in which the mobile station performs synchronization with the base station corresponding to the scanned preamble signal.

In contrast, when the preamble signal is not scanned in step 702, the mobile station proceeds to step 706, in which the mobile station selects another FA. At this time, the mobile station may select another FA included in the MOB_BSHO-REQ message.

After performing the synchronization in step 704, the mobile station determines in step 708 if it is possible to use another FA. If it is determined that it is possible to use another FA, the mobile station proceeds to step 710. Otherwise, the mobile station proceeds to step 706.

If it is determined that it is possible to use another FA, the mobile station recognizes that it is possible to perform communication using the other FA. Therefore, the mobile station performs a ranging process with a corresponding base station in step 710, and performs the remaining network entry process in step 712.

An operation procedure of a mobile station, which has approved or denied an FA handover when a base station has denied the FA handover will be described with reference to FIG. 8.

Figure 8:
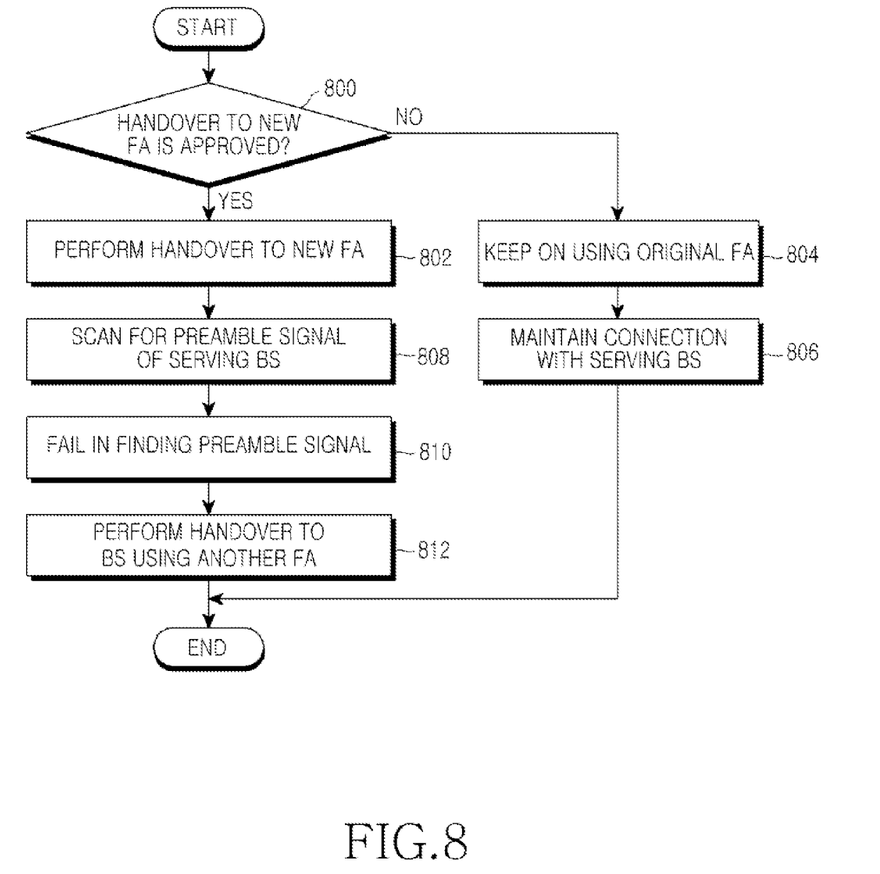
FIG. 8 is a flowchart illustrating an operation procedure of a mobile station, which has approved or denied an FA handover when a base station according to an exemplary embodiment of the present invention denied the FA handover.

FIG. 8 is a flowchart illustrating an operation procedure of a mobile station, which has approved or denied an FA handover when a base station has denied the FA handover according to an exemplary to embodiment of the present invention.

Referring to FIG. 8, when the base station has denied the handover to the new FA, the mobile station may approve the handover to the new FA in step 800. When the mobile station has approved the handover to the new FA, the mobile station proceeds to step 802, in which the mobile station performs the handover to the new FA. Otherwise, the mobile station proceeds to step 804.

In step 804, the mobile station continues to use the original FA since it has denied the handover to the new FA. Further, in step 806, the mobile station maintains the connection with the serving base station.

After the mobile station performs the handover to the new FA in step 802, the mobile station proceeds to step 808 and scans for the preamble signal of the serving base station. Since the handover to the new FA is performed only in the mobile station, the mobile station cannot avoid failing in finding the preamble signal in step 810.

Therefore, in step 812, the mobile station selects a base station using another FA from among the base stations included in the neighbor list and performs a handover to the selected base station.

According to exemplary embodiments of the present invention as described above, a base station capable of using only one FA can more effectively perform an FA switching with existing mobile stations. Further, according to the present invention, since a base station can effectively switch the FA used for communication with a mobile station even when there is a change in the network environment, the mobile station can continuously receive the service without degradation in the service quality.

Exemplary embodiments of the present invention can enable FA switching by a base station even when a mobile station does not support the use of a Dynamic Frequency Selection (DFS) algorithm. Further, exemplary embodiments of the present invention enables FA switching using the handover message format and processing defined in the IEEE 802.16e standard, which guarantees the compatibility with an existing IEEE 802.16e system. Therefore, since a base station can effectively switch the FA used in the communication with a mobile station even when there is a change in the network environment, the mobile station can continuously receive the service without degradation in the service quality.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for Frequency Assignment (FA) switching of a base station in a wireless communication system, the method comprising:

broadcasting a neighbor list to mobile stations, the neighbor list including a base station identifier, an FA identifier, a preamble index corresponding to a first FA, and neighbor base station information;

one of unicasting a scanning indication message for the first FA to each of the mobile stations and broadcasting the scanning indication message to the mobile stations;

temporarily switching a second FA, which is being currently used, to the first FA;

transmitting, to the mobile stations, a preamble signal corresponding to the first FA by using the FA identifier and the preamble index during a preset scanning time interval; and switching the second FA to the first FA according to a scanning result received from the mobile stations in response to the scanning indication message.

2. The method of claim 1, wherein the base station identifier comprises one of a base station identifier acquired from a Wireless System Manager (WSM) managing base stations and a virtual neighbor base station identifier generated for the first FA by the base station.

3. The method of claim 1, wherein the scanning indication message comprises the FA identifier, scanning start point information indicating a start point at which scanning should be started, and scanning time interval information indicating a time interval during which the scanning should be performed.

4. The method of claim 1, wherein the switching the second FA to the first FA comprises:

if it is determined to switch from the second FA to the first FA according to the scanning result received from the mobile stations, transmitting, to the mobile stations, a handover request message indicating that the first FA has been set as a target base station;

receiving, from the mobile stations, handover response messages, each of the response messages including information regarding whether to indicate a handover; and switching the second FA to the first FA based on the information regarding whether to indicate the handover included in the handover response messages.

5. The method of claim 1, wherein the preamble signal corresponding to the first FA comprises a preamble signal determined in accordance with the FA identifier and the preamble index.

6. A method for Frequency Assignment (FA) switching of a mobile station in a wireless communication system, the method comprising:

receiving a neighbor list including a base station identifier, an FA identifier, a preamble index corresponding to a first FA, and neighbor base station information broadcasted from a base station, and a scanning indication message for the first FA, to which the FA switching is to be performed, the scanning indication message being one of unicasted and broadcasted from the base station;

temporarily switching a second FA, which is being currently used, to the first FA, and receiving a preamble signal corresponding to the first FA during a preset scanning time interval;

scanning the preamble signal using scanning information for the first FA included in the scanning indication message;

transmitting a scanning result to the base station; and switching the second FA to the first FA according to a control of the base station.

7. The method of claim 6, wherein the scanning information for the first FA comprises the FA identifier, scanning start point information indicating a start point at which scanning should be started, and scanning time interval information indicating a time interval during which the scanning should be performed.

8. The method of claim 6, wherein the preamble signal corresponding to the first FA comprises a preamble signal determined in accordance with the FA identifier and the preamble index.

9. The method of claim 6, wherein the switching of the second FA to the first FA comprises:

receiving, from the base station, a handover request message indicating that the first FA has been set as a target base station;

determining whether to perform a handover for the first FA;

transmitting, to the base station, a handover response message including information regarding whether to perform the handover; and switching the second FA to the first FA according to a control of the base station.

10. A base station in a wireless communication system, the base station comprising:

a transmitting unit for broadcasting a neighbor list to mobile stations, the neighbor list including a base station identifier, a Frequency Assignment (FA) identifier, a preamble index corresponding to a first FA, and neighbor base station information, and one of unicasting a scanning indication message for the first FA to each of the mobile stations and broadcasting the scanning indication message to the mobile stations;

a receiving unit for receiving a scanning result from the mobile stations;

an FA selection unit for selecting the first FA to FA switching;

a neighbor list management unit for managing the neighbor list; and a control unit for temporarily switching a second FA, which is being currently used, to the first FA, for transmitting, to the mobile stations, a preamble signal corresponding to the first FA by using the FA identifier and the preamble index during a preset scanning time interval through the transmitting unit, and for switching the second FA to the first FA according to the scanning result received from the mobile stations in response to the scanning indication message.

11. The base station of claim 10, wherein the base station identifier comprises one of a base station identifier acquired from a Wireless System Manager (WSM) managing base stations and a virtual neighbor base station identifier generated for the first FA by the base station.

12. The base station of claim 10, wherein the scanning indication message comprises the FA identifier, scanning start point information indicating a start point at which scanning should be started, and scanning time interval information indicating a time interval during which the scanning should be performed.

13. The base station of claim 10, wherein, if it is determined to switch from the second FA to the first FA according to the scanning result received from the mobile stations, the control unit transmits, to the mobile stations, a handover request message indicating that the first FA has been set as a target base station through the transmitting unit, receives, from the mobile stations, handover response messages, each of the response messages including information regarding whether to indicate a handover through the receiving unit, and switches the second FA to the first FA based on the information regarding whether to indicate the handover included in the handover response messages.

14. The base station of claim 10, wherein the preamble signal corresponding to the first FA comprises a preamble signal determined in accordance with the FA identifier and the preamble index.

15. A mobile station in a wireless communication system, the mobile station comprising:

a transmitting unit;

a receiving unit for receiving a neighbor list including a base station identifier, a Frequency Assignment (FA) identifier, a preamble index corresponding to the first FA, and neighbor base station information broadcasted from the base station, and a scanning indication message for a first FA, to which the FA switching is to be performed, the scanning indication message being one of unicasted and broadcasted from the base station;

a control unit for temporarily switching, after receiving the scanning indication message, a second FA, which is being currently used, to the first FA, receiving a preamble signal corresponding to the first FA during a preset scanning time interval through the receiving unit, for scanning the preamble signal using scanning information for the first FA included in the scanning indication message, for transmitting a scanning result to the base station through the transmitting unit, and for switching the second FA to the first FA according to a control of the base station.

16. The mobile station of claim 15, wherein the scanning information for the first FA comprises the FA identifier, scanning start point information indicating a start point at which scanning should be started, and scanning time interval information indicating a time interval during which the scanning should be performed.

17. The mobile station of claim 15, wherein the preamble signal corresponding to the first FA comprises a preamble signal determined in accordance with the FA identifier and the preamble index.

18. The mobile station of claim 15, wherein the control unit receives, from the base station, a handover request message indicating that the first FA has been set as a target base station through the receiving unit, determines whether to perform a handover for the first FA, transmits, to the base station, a handover response message including information regarding whether to perform the handover through the transmitting unit, and switches the second FA to the first FA according to a control of the base station.

* * * * *